Patented Sept. 21, 1943

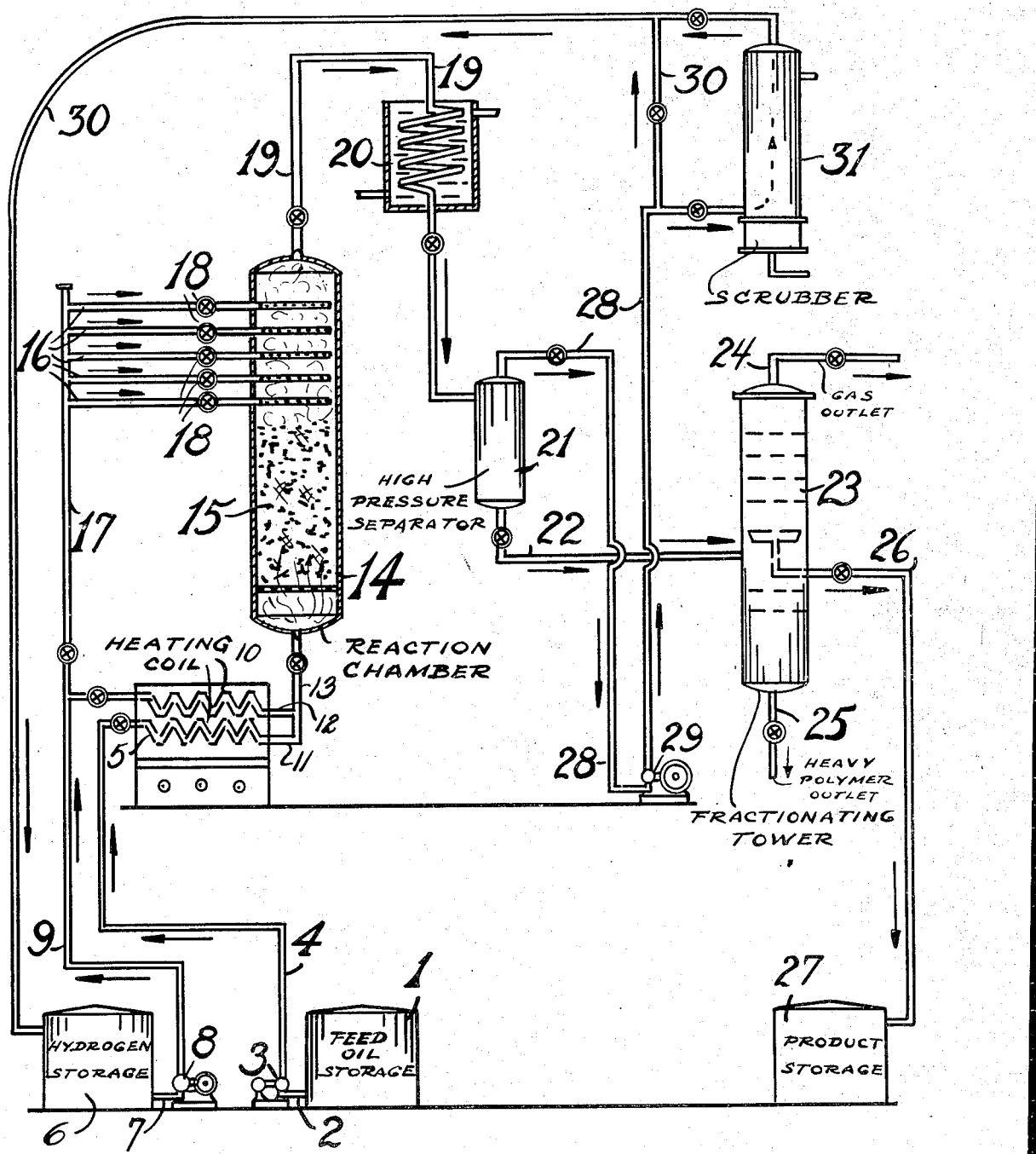

2,330,069

UNITED STATES PATENT OFFICE 2,330,069

PROCESS FOR MAKING FINISHED MOTOR FUEL

Edward T. Marshall, Baton Rouge, La., assignor, by mesne assignments, to Standard Catalytic Company, a corporation of Delaware Application October 28, 1939, Serial No. 301,736

2 Claims. (Cl. 196—52)

This invention relates to a process of preparing finished internal combustion engine fuels by a process of catalytic reforming in the presence of hydrogen and is more particularly concerned with certain improvements in said process.

The term "catalytic reforming in the presence of hydrogen" wherever used in the specification and claims shall be understood to mean any process in which materials consisting essentially of hydrocarbons substantially boiling in the gasoline range are subjected to heat treatment at a temperature in excess of 500° F., in the presence of a catalyst and in the presence of substantial quantities of added hydrogen or gases rich in free hydrogen, in which there is either no net consumption of free hydrogen or there is a net production of free hydrogen, to produce a dehydrogenated or otherwise chemically reconstructed product, for example of anti-knock characteristics superior to those of the starting material, with or without an accompanying change in molecular weight. By the term "chemically reconstructed" is meant something more than the mere removal of impurities or finishing treatments. The term catalytic reforming in the presence of hydrogen shall be understood to include, but not by way of limitation, reactions such as dehydrogenation, aromatization or cyclization, desulfurization, alkylation, hydrogenation and isomerization, all or some of which may occur to a greater or lesser extent during the process depending upon the operating conditions. For example, by adjusting either the temperature, pressure or partial pressure of hydrogen or by simultaneously adjusting all three it is possible to place the emphasis upon dehydrogenation, on the one hand, or hydrogenation on the other.

Catalytic reforming in the presence of hydrogen like catalytic reforming in the absence of hydrogen is characterized by the fact that the catalyst requires periodic regeneration. The length of time the catalyst can be used before it requires regeneration is however substantially longer in the case of catalytic reforming in the presence of hydrogen.

A two-stage process of catalytic reforming in the presence of hydrogen has been proposed which is characterized by the facts that operating conditions in the first stage are so adjusted that the predominant reactions are dehydrogenation and aromatization and operating conditions in the second stage are so adjusted that the predominant reaction is hydrogenation. This two-stage process makes it possible to produce directly an internal combustion engine fuel of high octane number, low acid heat and low Army gum content without having to resort to acid or clay treating. According to one preferred method of carrying out the said two-stage process, the same type of catalyst is used in both stages, substantially the same total pressure is maintained in both stages, but the temperature is higher in the first stage than in the second, and the oil feed rate per volume of catalyst is generally lower in the first stage than in the second. According to other methods of carrying out the two-stage process, the temperature may be the same in both stages and either the partial pressure of hydrogen or the total pressure or both may be higher in the second stage. It will be understood that the chief objective in this two-stage process is to make dehydrogenation and aromatization predominate in the first stage and to make hydrogenation predominate in the second.

I have now found that this objective may be obtained when only one reaction zone is used by injecting cold hydrogen-containing gas into that portion of the reaction zone near the point at which the reacting materials are removed. I have observed that the introduction of cold hydrogen-containing gas performs the dual function of reducing the temperature of the reacting materials and increasing the partial pressure of hydrogen therein with the result that a hydrogenating effect will predominate in the latter end of the reaction zone. Moreover, because of the fact that temperature is lowered and partial pressure of hydrogen is increased simultaneously it is not necessary to cool to as low a temperature nor to raise the partial pressure of hydrogen as high in order to get the desired hydrogenating effect as would be the case if temperature alone or partial pressure alone were adjusted.

The present invention therefore relates to a method of carrying out a process of catalytic reforming in the presence of hydrogen in a single reaction zone in which a predominantly dehydrogenating and aromatizing effect is obtained in that portion of the zone nearer the point of introduction of the reacting materials and a predominantly hydrogenating effect is obtained in that portion of the reaction zone nearer the point at which the reacting materials are removed. The method of carrying out the process will be fully understood from the following description when read with reference to the accompanying drawing which is a semi-diagrammatic view in sectional elevation of one type of apparatus that may be used and shows the lines of flow.

Referring to the drawing, numeral 1 designates a supply of hydrocarbon oil to be converted to a finished fuel of high octane number and low acid heat and low gum content. This hydrocarbon oil may have been derived from any source and preferably consists of hydrocarbons boiling substantially in the gasoline range, say from 100 to 450° F. The character of the hydrocarbon oil is immaterial, i. e., it may be paraffinic, naphthenic, aromatic or olefinic and it may have either a high or low sulfur content. Hydrocarbon oil is drawn from tank 1 through line 2 by means of pump 3 and forced through line 4 into and through a heating coil 5. Hydrogen or a gas rich in free hydrogen is stored in a holder 6 and is drawn through line 7 by means of pump 8 and forced through line 9 into and through a heating coil 10 which may be mounted in the same furnace setting as heating coil 5 or in a separate furnace. In the heating coils the oil and gas rich in free hydrogen are heated to a temperature somewhat above the temperature to be maintained in the reaction zone. Heated oil leaves coil 5 through line 11 and heated hydrogen leaves coil 10 through line 12 and the two converge in line 13 which carries a mixture of heated oil and hydrogen into a reaction chamber 14 which contains a catalytic material 15, the nature of which will be more fully disclosed below.

A plurality of pipes 16 extends through the walls of the reaction zone and terminates in a series of small openings in the upper portion thereof. A portion of the gas rich in free hydrogen flowing through line 9 is diverted through line 17 into lines 16 through which the gas is admitted directly into the upper portion of the reaction zone. A plurality of valves 18 is provided in the lines 16 so that gas may be introduced through one or more of the pipes 16. The function of the gas rich in free hydrogen introduced into the upper portion of the reaction zone is twofold, namely, it serves to increase the partial pressure of the hydrogen in the reacting materials at the point of introduction and it also serves simultaneously to cool the reacting materials to a temperature at which a hydrogenating effect predominates.

The middle and lower portions of the reaction zone are maintained at a temperature between 850 and 1050° F., preferably between 900 and 1000° F., and the upper portion is maintained by means of the introduction of cold hydrogen-containing gas at a substantially lower temperature, say between 600 and 850° F. The pressure in the reaction zone is maintained between about 50 and 500 pounds per square inch, preferably between 50 and 300 pounds per square inch. The oil is fed to the reaction zone at a rate between 0.1 and 4.0 volumes of liquid oil per volume of catalyst per hour, preferably between 0.2 and 1.5 v./v./hr. The quantity of gas introduced with the oil through line 13 into the bottom portion of the tower is between 1000 and 3000 cubic feet per barrel of oil and this gas should contain between 20 and 90 mol percent of free hydrogen, preferably between 40 and 70 mol percent. The quantity of gas introduced into the upper portion of the reaction zone through the plurality of lines 16 will be adjusted according to the temperature of the entering gas, the temperature to which it is desired to cool the reacting materials in the upper portion of the reaction zone and the proportion of the upper part of the reaction zone which it is desired to maintain under predominantly hydrogenating conditions. In general, it may be said that the quantity of gas to be introduced into the upper portion of the reaction zone will be between 500 and 3000 cubic feet per barrel of oil.

Products of reaction leave reaction zone 14 through line 19, pass through a cooling means 20 and thence discharge into a high pressure separator 21 wherein gaseous and liquid products may be separated. Liquid products are removed from high pressure separator 21 through line 22 and introduced directly into a fractionating and stabilizing means 23. Constituents which are too volatile for the desired product are removed from the fractionating means through line 24 and may be passed to a gas absorption system or otherwise disposed of. Constituents which are too high boiling for the desired product, such as heavy polymer fractions, are removed from the fractionating means 23 through line 25. The desired product is removed from the fractionating means 23 through line 26 and collected in a storage tank 27. Ordinarily it will be found that this product does not require the usual acid or clay treatment because the acid heat and gum content will be sufficiently low to meet most specifications. However, it may be desirable or necessary to rerun the product to a specified end point.

Returning to the high pressure separator 21, gaseous products are removed therefrom through line 28. They then pass through a booster 29 which recompresses them to reaction pressure or above and returns them through line 30 to the hydrogen holder 6 from which they may be recycled continuously through the reaction zone. In the event that it is desired to increase the hydrogen concentration in the recycle gases this may be accomplished by passing a portion or all of the gases leaving the high pressure separator 21 through a scrubbing means designated by the numeral 31 prior to their return to the hydrogen holder 6. The purpose of the scrubbing means is to remove a substantial proportion of the hydrocarbon constituents from the recycle gases. This may be done by any suitable means, such as by scrubbing the recycle gases with a light hydrocarbon oil which will absorb hydrocarbons but substantially no hydrogen.

In the operation of the process the flow of oil through the reaction zone 14 is continued until (1) there ceases to be an overall net production of free hydrogen, or (2) the activity of the catalyst falls to such an extent that the octane number of the product produced falls substantially below a predetermined level, whichever of these two things occurs first. In most cases it will be found that the second of these things will occur first. When this happens the flow of oil through the reaction zone is stopped and the catalyst is then subjected in situ to a regeneration treatment. The preferred method of regeneration is to pass hot inert gases containing regulated quantities of oxygen through the reaction zone whereby combustion of the carbonaceous contaminants on the catalyst is caused to occur. The flow of hot regeneration gases through the reaction zone is continued until there ceases to be a consumption of oxygen from said gases. This will ordinarily indicate that no more carbonaceous material capable of being burned off remains on the catalyst. For purposes of regeneration inert gases, such as flue gases, carbon dioxide, nitrogen and the like may be used. The oxygen is conveniently supplied by mixing air with the inert gas. The quantity of oxygen in the regenerating gases will range between 0.1 and 10%. The temperature at which the hot gases are introduced into the reaction zone should be between about 600 and 950° F. and care should be taken that the maximum temperature developed in the reaction zone does not rise appreciably above 1200 to 1300° F. because temperatures higher than this appear adversely to affect the structure of the catalyst. Temperature may be controlled by regulating the percentage of oxygen in the hot gases. Regeneration under pressure between 50 and 200 pounds per square inch is advantageous because it is found that the ignition temperature and the time required for regeneration may be reduced. Following regeneration the flow of oil through the reaction zone may be resumed and the alternation of reaction and regeneration cycles may be continued for an indefinite period of time until the catalyst requires replacement.

The length of a reaction cycle will ordinarily be between 6 and 12 hours or more and the length of time required for regeneration may be the same or substantially shorter. Although only one reaction zone has been illustrated in the drawing, it will be understood that two or more reaction zones may be hooked up to the same system so that while one reaction zone is on a regeneration cycle another reaction zone may be on a reaction cycle.

When starting up the process, hydrogen or a gas rich in free hydrogen may have to be supplied from an extraneous source. However, after once having started up, the process is operated under such conditions that there is a net production of free hydrogen therein so that it is not necessary to add hydrogen from an extraneous source because the hydrogen initially added and that produced in the process may be continuously recycled. Even if hydrogen is not available from an extraneous source for starting up, it may be readily produced by operating the process for a period of several hours or more at atmospheric or slightly higher pressure. Under these conditions substantial quantities of hydrogen are produced and after relatively short periods of operation sufficient hydrogen will have been produced to enable the process to proceed under the desired conditions. The pressure can be gradually increased to the desired level for reaction without interrupting operation.

The catalysts used may be selected from a wide variety of different materials which promote reforming. Preferred catalysts are compounds such as the oxides or sulfides of metals of the IV, V, VI and VIII groups of the periodic system. These may be used alone, in various mixtures or combinations with each other, or in combination with various supports or carriers which may also have some catalytic activity. Especially suitable metal oxides are those of chromium, molybdenum, tungsten, vanadium, cobalt and nickel. Especially suitable carriers or supports are bauxite, Super-Filtrol, silica gel, activated alumina, alumina gel, peptized alumina gel and the like, to mention only a few. Mixtures of alumina and chromium oxide, alumina and molybdenum oxide and alumina and vanadium oxide in which the active metal oxide is present in amounts between 1 and 50% by weight are particularly effective. The catalyst may be prepared by mechanical mixing of the various ingredients, by impregnating the carrier or support with a solution of the active metal compound and then heating the impregnated mass to convert the metal compound to the oxide, or by co-precipitating the carrier, as in the case of alumina, with the active metal oxide from a solution containing soluble salts of aluminum and the other metal or metals. The catalyst may be used in various shapes and forms, such as pills, tablets, granules or other small pieces of regular or irregular shape. The entire reaction zone may be filled with small pieces of catalytic material or it may be provided with two or more shelves or trays on each of which a bed of catalyst may be supported.

In the early stages of a reaction cycle, the catalyst will be more active in promoting dehydrogenation and aromatization than in the later stages. As the reaction cycle proceeds, it is desirable to increase progressively the portion of the reaction zone which is maintained under conditions which favor dehydrogenation and aromatization in order to offset the decrease in catalytic activity and to maintain a substantially uniform degree of conversion. By way of illustration, it may be said that at the beginning of a reaction cycle it may only be necessary to devote approximately one-half of the reaction zone to dehydrogenation and aromatization, while as the reaction proceeds more and more of the reaction zone is devoted to dehydrogenation until finally near the end of a reaction cycle approximately two-thirds or more of the entire reaction zone may be maintained under dehydrogenating conditions. This, of course, means that the portion of the reaction zone devoted to hydrogenation will progressively decrease. The progressive increase in the size of the portion of the reaction zone devoted to dehydrogenation may be conveniently effected by adjusting the point or points at which the cold hydrogen-containing gas is introduced into the upper portion of the reaction zone. For example, at the start the cold gas may be introduced through the lowermost of the plurality of pipes 16 so that a relatively large section of the upper portion of the reaction zone is maintained under predominantly hydrogenating conditions. As it is necessary to increase the portion devoted to dehydrogenation, the point at which the cold gas is introduced may be progressively raised so that finally near the end of the reaction cycle the cold hydrogen-containing gas will be introduced almost entirely through the uppermost of the pipes 16. Notwithstanding that the portion of the reaction zone devoted to hydrogenation is thus progressively decreased, the degree of hydrogenation obtained can be maintained substantially constant by progressively increasing the temperature at which the upper portion of the reaction zone is maintained. In the drawing the feed has been shown as being introduced into the bottom portion of the reaction zone and the products are removed from the upper portion thereof. It will be understood, however, that the flow may be reversed with equally satisfactory results so that the feed enters the top and the products are withdrawn from the bottom.

With most naphthas it will be found that the net quantity of free hydrogen produced in the dehydrogenating and aromatizing reaction will be more than sufficient to maintain the required hydrogen concentration in the recycle gases. For example, by adjusting the operating conditions the net quantity of free hydrogen produced may range between 100 and 500 cubic feet per barrel of naphtha. The entire process may therefore be operated under conditions such that the hydrogen produced in the dehydrogenation section of the reaction zone will more than compensate for the hydrogen which may be consumed in the hydrogenating section of the reaction zone with the result that there is either no net consumption of free hydrogen or there is an overall net production of free hydrogen.

This invention is not limited by any theories of the mechanism of the reactions nor by any details which have been given merely for purposes of illustration but is limited only in and by the following claims in which it is intended to claim all novelty inherent in the invention.

I claim:

1. An improved process for preparing a finished internal combustion engine fuel of high octane number, low acid heat and low gum content which comprises introducing a mixture of gas rich in free hydrogen and a vaporized hydrocarbon oil boiling substantially between 100 and 500° F. into a reaction zone containing a rigidly arranged catalyst which promotes reforming and is capable of being regenerated, maintaining the entire reaction zone under a total pressure between 50 and 300 pounds per square inch, maintaining that portion of the reaction zone nearest the point of introduction of the oil and gas thereinto at a temperature between 900 and 1000° F. and under a partial pressure of hydrogen in the lower range of partial pressures suitable for reforming, maintaining the remaining portion of the reaction zone at a temperature between 600 and 850° F. and at a partial pressure of hydrogen in the upper range of partial pressures suitable for reforming by the introduction directly into said remaining portion of a cold gas containing free hydrogen, progressively increasing the proportion of the entire reaction zone which is maintained at the higher temperature as the reaction cycle proceeds by progressively moving the point at which the cold gas containing the free hydrogen is introduced nearer to the exit end of the reaction zone, removing reaction products from the reaction zone, and recovering from said products a fraction boiling in the range of an internal combustion engine fuel.

2. Process according to claim 1 in which the temperature maintained in that portion of the zone nearest the exit end of the products is progressively increased between 600 and 850° F. as the proportion of the entire reaction zone which is maintained at temperatures between these limits is progressively decreased.

EDWARD T. MARSHALL.